United States Patent
Lin et al.

(10) Patent No.: US 11,725,973 B2
(45) Date of Patent: Aug. 15, 2023

(54) OIL MONITORING SYSTEM AND METHOD AND A ROTARY METER WITH OIL MONITORING SYSTEM

(71) Applicant: ROMET LIMITED, Mississauga (CA)

(72) Inventors: Lezhong Lin, Mississauga (CA); Brent Collver, Mississauga (CA); Andrew Smich, Mississauga (CA)

(73) Assignee: ROMET LIMITED, Mississauga (CA)

( * ) Notice: Subject to any disclaimer, the term of this patent is extended or adjusted under 35 U.S.C. 154(b) by 164 days.

(21) Appl. No.: 17/242,114

(22) Filed: Apr. 27, 2021

(65) Prior Publication Data

US 2021/0341329 A1  Nov. 4, 2021

Related U.S. Application Data

(60) Provisional application No. 63/018,116, filed on Apr. 30, 2020.

(51) Int. Cl.
*G01F 23/00* (2022.01)
*G01F 15/14* (2006.01)

(52) U.S. Cl.
CPC .......... *G01F 23/0007* (2013.01); *G01F 15/14* (2013.01)

(58) Field of Classification Search
CPC .................. G01F 15/14; G01F 23/0007

USPC ............................................. 73/198
See application file for complete search history.

(56) References Cited

U.S. PATENT DOCUMENTS

| 10,341,167 B2 | 7/2019 | Arunachalam et al. |
| 2011/0308888 A1* | 12/2011 | Carothers ................. F16N 7/38 |
| | | 184/6.1 |
| 2019/0063678 A1* | 2/2019 | Ganiger .................. F01D 25/18 |

FOREIGN PATENT DOCUMENTS

EP  1464926 A1 * 10/2004 ............... G01F 1/10

* cited by examiner

*Primary Examiner* — Nathaniel T Woodward

(57) ABSTRACT

By implementing an oil monitoring in a rotary meter, the meter can check the oil level, condition and/or both level and condition and report any issues detected such as out-of-limit low oil condition, contamination, etc. The function can trigger a preventative maintenance on the rotary gas meter with a view to improving its longevity. Oil level monitoring may be signalled using sensors such as switches. Oil colour, clarity, aeration and foaming, corrosion, varnish, wear debris, or other quality monitoring may be signalled using sensors such as spectrometers. A rotary meter may be configured with one or more such sensors for (multi-) parameter monitoring and the one or more sensors positioned in respective locations such as at an oil reservoir.

19 Claims, 3 Drawing Sheets

OIL MONITORING SYSTEM AND METHOD AND A ROTARY METER WITH OIL MONITORING SYSTEM

CROSS-REFERENCE

This application claims the benefit of U.S. Provisional Application No. 63/018,116 filed Apr. 30, 2020, the contents of which is incorporated herein by reference.

FIELD

The present disclosure relates to rotary meters to measure a fluid and more particularly to an oil monitoring system, such as an oil condition indicative of meter health, to improve longevity of rotary meters.

BACKGROUND

Rotary gas meters have bearings to support rotating impellers, often a pair of such impellers. As well, timing gears synchronize the two impellers into a proper position relative to each other. Lubrication oil is used for lubricating working surfaces of conventional bearings and gears in rotary meters.

Although measures are taken to prevent oil from entering a metering chamber such as by using an oil guard or sealed bearings, regularly, over time, such measures are insufficient to maintain zero oil seepage through bearings. Both the oil chamber and metering chamber are under fluctuating pressure and, at least occasionally, oil can be sucked into the metering chamber in the form of mist, even in a tiny amount. Oil consumption occurs where the oil is removed and as a result it cannot perform its primary purpose to lubricate the working surfaces. Instances of the tiny amount of consumption can be accumulated substantially and in the worst case, this oil consumption may drain all lubrication oil between a next scheduled service event for a particular meter. Further, oil may become contaminated and its condition may deteriorate.

SUMMARY

There is provided an oil monitoring system and method and a rotary meter having an oil monitoring system. Oil monitoring may sense a condition of oil (e.g. lubricating oil) in the rotary meter and the condition may be any one or more of oil level, colour, clarity, aeration and foaming, corrosion, varnish, wear debris, or other quality indicative of meter health.

There is provided, in accordance with an embodiment, an oil monitoring system comprising: at least one oil sensing unit to provide at least one oil signal from at least one location within a rotary meter to be monitored; one or more alarm signaling interfaces; and a main control unit configured to be coupled to at least one oil sensing unit and the one or more alarm signaling interfaces; wherein the main control unit is configured to: detect a condition of oil at the at least one location using the at least one oil sensing unit; and control at least one of the one or more alarm signaling interfaces to provide an alarm in response to the condition of oil.

In any embodiment, the at least one location may collect oil (e.g. as a result of oil consumption) within the rotary meter.

The oil sensing system, in any embodiment, may be configured using applicable gates (e.g. an AND, an OR or a combination) to combine oil sensing signals from pairs of oil sensing units. For example, a pair of oil sensing units may be positioned in respective positions at a respective one of the at least one location, one of the pair positioned to sense the oil when the rotary meter is in a first orientation during use and one of the pair positioned to sense the oil level when the rotary meter is in a second orientation during use. The first orientation may be a vertical orientation and the second orientation may be a horizontal orientation. The main control unit may receive one oil signal from the pair of oil sensing units via an AND gate, such as when sensing an oil level condition. For example, the at least one location may comprises at least two locations and the main control unit may receive one oil signal from the at least one oil sensing unit via an OR gate.

In any embodiment, the at least one location may comprise one or both of a magnetic meter chamber and a thrust chamber.

In any embodiment, the main control unit may comprise a storage device and the main control unit may be further configured to control a logging of the alarm to the storage device.

In any embodiment, the one or more alarm signaling interfaces may comprise a display unit or a communication interface to communicate the alarm to a location remote from the rotary meter. The communication interface may comprise or be coupled to an antenna.

In any embodiment, the at least one oil level sensing unit may comprise an open-collector output sensor such that the sensor is open (high) when an oil level is low. The open-collector output sensor may comprise any one of an ultrasonic level switch; a floater level switch; and an optical level switch.

In any embodiment, the at least one oil condition sensing unit comprises a spectrometer.

In any embodiment, the condition of oil may comprise any one or more of oil level, colour, aeration, contamination or other quality indicative of health of the meter.

In any embodiment, a rotary meter may have an oil monitoring system in accordance with the features shown and described.

In an embodiment, there is provided a method comprising receiving at least one oil condition signal from at least one oil sensing unit from at least one location within a rotary meter to be monitored; detecting a condition of oil at the at least one location using the at least one oil condition sensing unit; and controlling at least one of one or more alarm signaling interfaces to provide an alarm in response to the condition of oil detected.

These and other aspects will be apparent to a person of skill in the art.

Figure 1:
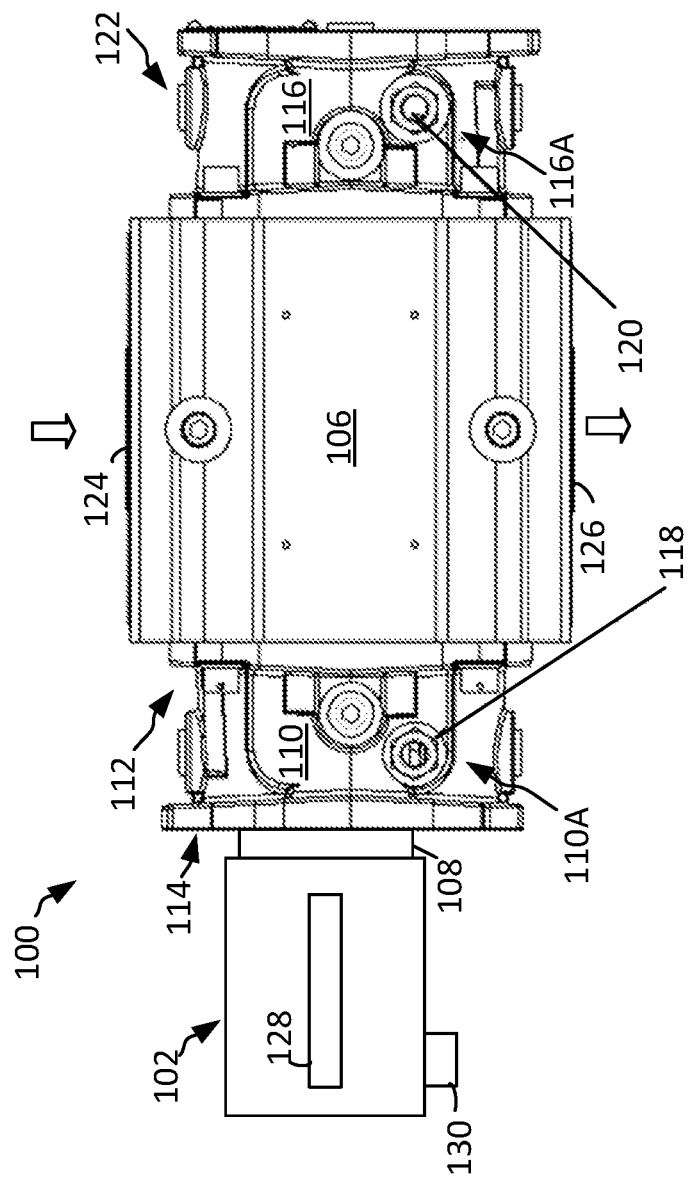
FIG. 1 is an illustration of a rotary meter with oil monitoring in accordance with an example.

The present concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

DETAILED DESCRIPTION

By implementing oil monitoring in a rotary meter, the meter can check the condition of the (e.g. oil level, other condition and/or both level and other condition) and report any issues detected such as out-of-limit low oil condition, contamination, etc. The monitoring function can trigger a preventative maintenance on the rotary gas meter with a view to improving its longevity. Oil level monitoring may be signaled using sensors such as switches. Other oil condition monitoring such as oil colour, clarity, aeration and foaming, corrosion, varnish, wear debris, or other quality indicative of meter health may be signaled using sensors such as spectrometers. A rotary meter may be configured with one or more such sensors for (multi-)parameter monitoring and the one or more sensors positioned in respective locations such as at an oil reservoir.

Oil Condition Monitoring—Oil Level

Oil level monitoring can be implemented by using a sensor such as a level switch selected for the task at hand and keeping in mind the working environment. An appropriate sensor may be selected in accordance with an appropriate size to function in the expected temperature range and pressure range, etc. Different types of sensors may be useful for such a task. Three different types of level switches, typically of a miniature size, that may be employed are an ultrasonic level switch; floater level switch; and optical level switch. Examples may include non-contact liquid level switches such as are available from numerous suppliers including ABB™, Siemens™, Thermo Scientific™, Endress+Hauser™, AMETEK™, Clark-Reliance™, GEMS™, GHM™, and Sitron™. A miniature float sensor may be available from Flowline™, Baker™, Dwyer™, APG™, Madison™, etc.

Oil monitoring may be implemented in an electronic gas meter platform. The electronic meter may be configured to determine the oil level measurement on a daily (or other periodic) basis. A period or other schedule may be chosen with a view to minimizing any extra power consumption due to the making of the measurement. Often the electronic meter platforms are battery powered rather than line powered due to their location in a facility.

While a single sensor may be used to measure oil consumption, such a single point of measurement may not be sufficient to achieve desired results. Rotary meters may be configured for mounting in a user selected horizontal or vertical orientation. Selectability provides flexibility and reduces requirements to have inventory of different types of meters. However, dedicated horizontal or vertical meters may be configured as well. For a selectable meter, a plurality of sensors, for example, four switches, may be mounted in locations within the meter that achieve measurement goals for sensing oil in particular chambers of the meter and when the meter is in a specific orientation. By way of example then, four oil level sensors may be positioned such that a first pair of the sensors are in a magnet housing chamber (magnetic metering chamber) and another pair are in a thrust chamber. One of each of the pairs is positioned for sensing oil when the meter is in a horizontal position and the other of each of the pairs is positioned for sensing oil when the meter is in a vertical position. In a dedicated horizontal or a vertical meter, a single sensor per chamber may be employed, for example, with one in each of two chambers. The position of the sensor therein may be in accordance with the type of sensor used. The sensors can be positioned in either of low or high position (e.g. relative to gravity) as may depend on the type of sensor used.

Oil Condition Monitoring—Other Oil Properties

In addition to or as an alternative to oil level monitoring (indicating oil consumption), other meter parameters may be monitored that are indicated by oil properties. Oil colour, clarity, aeration (e.g. foaming), meter corrosion, varnish, wear debris, or other quality monitoring indicative of meter health may be signaled using sensors such as spectrometers. One or more spectrometer(s) may be mounted to measure oil properties and provide signals (e.g. data) to a control unit. The data representing the oil properties may be stored, evaluated and an alarm may be triggered. The data and/or alarm may be communicated via a communication interface. The data may be processed (e.g. averaged, conditioned, etc.) prior to evaluation such as against one or more comparative thresholds, baselines, operating ranges, etc. Aspects of the oil level monitoring apply to oil condition monitoring as well be understood to a person of ordinary skill.

Various types of spectrometers may be employed including one or more of colorimeters, UV spectrometers and IR spectrometers. A rotary meter may have more than one oil reservoir (location for measuring an oil condition). It may be that one type of spectrometer is used in one oil reservoir and another type is used in a second reservoir. Applicable spectrometer configuration and baseline data may be stored such as on a storage device for a control unit (e.g. processing unit) of the rotary meter to enable use and measuring via the spectrometer(s).

FIG. 1 shows an embodiment of a rotary meter 100 in a vertical meter mount with an electronic gas meter platform 102. Electronic gas meter platform 102 provides a main control unit for the rotary meter. Electronic gas meter platform 102 may provide a foundation of an oil monitoring system, defining a main control unit therefor as well. Electronic gas meter platform 102 has a platform housing 104. In FIG. 1, platform housing 104 is mounted to a rotary meter housing 106 of meter 100 via a mounting bracket 108. As shown in FIG. 1, mounting bracket 108 may couple to a magnetic meter housing 110 on one end of rotary meter housing 106. Internally to magnetic meter housing 110 there is a chamber 112 having a magnetic meter 114 that is responsive to the rotation of a shaft driven by a rotary impeller in rotary meter housing 106 to measure a flow of fluid through the rotary gas meter 100.

On the side of rotary meter housing 106, opposite from magnetic meter housing 110, is thrust housing 116. In each of the magnetic meter housing 110 and the thrust housing 116 are respective oil reservoirs 110A and 116A where oil is collected as a result of oil consumption within the rotary meter 100. A pair of sensors 118 and 120 are shown on respective faces of magnetic meter housing 110 and thrust housing 116 for sensing oil in the respective locations of oil reservoirs 110A and 116A. It will be understood that though one sensor is shown in the respective locations, more than one sensor may be used such as to measure and monitor more than one property. For example, it may be preferred to use a particular sensor for oil level monitoring and a particular sensor for other parameter monitoring.

Though not shown, rotary meter 100 may be configured for horizontal mounting, where the meter 100 is rotated 90° relative to FIG. 1. A pair of oil sensors (not shown) may be mounted via respective other faces of magnetic meter housing 110 and thrust housing 116. A position of electronic gas meter platform 102 may be adjusted for viewing when in horizontal mounting. In another embodiment (also not shown) a selectable configuration for mounting in either orientation may be provide having four sensors in respective pairs that are positioned so that there are two sensors in each chamber. One (or more) sensor in each chamber is positioned for horizontal orientation and the others are positioned respectively for vertical orientation.

Oil sensor 118 is mounted for sensing an oil level in chamber 112 within magnetic meter housing 110. Oil sensor 120 is mounted for sensing an oil level in a thrust chamber 122 internal to thrust housing 116. Though not shown, sensor wiring (e.g. running externally to respective housings 110 and 116) may couple the sensors 118 and 120 to platform 102. As noted oil sensors 118 and 120 may be mounted for sensing other oil properties. Additional oil sensors may be mounted (not shown).

Rotary meter 100 is configured for vertical orientation. That is, meter 100 has flow inlet 124 and outlet 126 vertically aligned such that a fluid (e.g. a gas) flows vertically through the meter.

Figure 2:
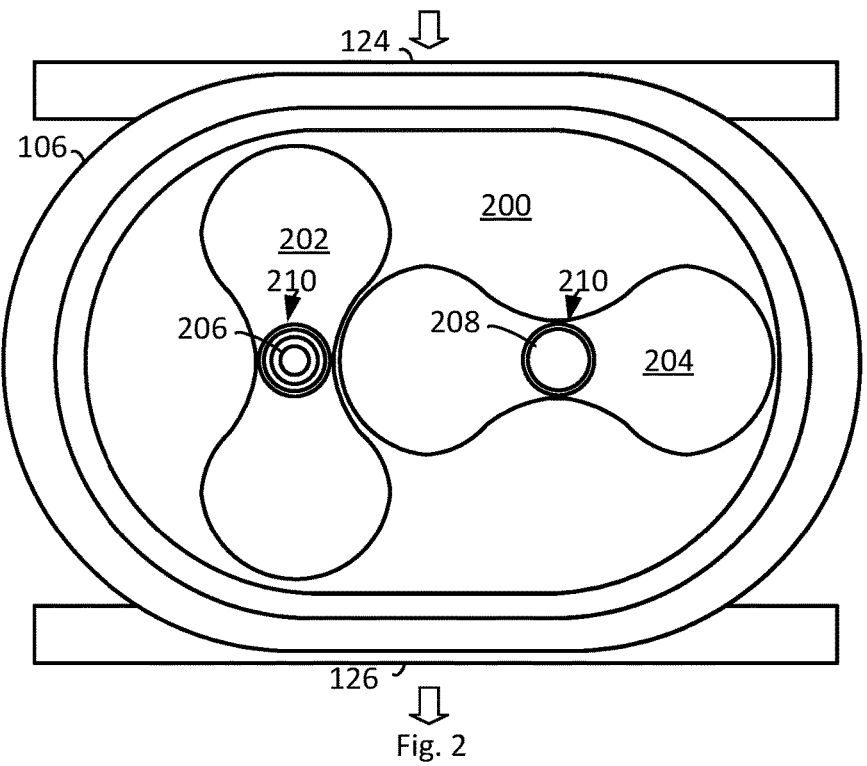
FIG. 2 is an interior view of a rotary meter.

FIG. 2 shows an interior 200 of housing 106, in an end view of meter 100. The view is enlarged relative to FIGS. 1A and 1B. Rotary meter housing 106 houses driven members such as a pair of rotary impellers 202 and 204. Interior 200 houses impellers 202 and 204 that are driven by the flow of fluid and the rotation of which impellers may be used to measure fluid rate and volume measurements. Rotary impellers rotate on a respective shaft such as shafts 206, 208 and are supported by bearings (generally indicated at 210 for shaft 206 and 212 for shaft 208).

Gearing (not shown) may be driven such as by impeller shaft 206 of impeller 202. The gearing may drive a mechanical counter such as for measuring volume, etc. Magnetic meter 113 may also be responsive to rotation of shaft 206 such as for an electronic counter or other measures (e.g. flow). As well timing gears (not shown) may be present to synchronize the respective rotation of the impellers.

Figure 3A:
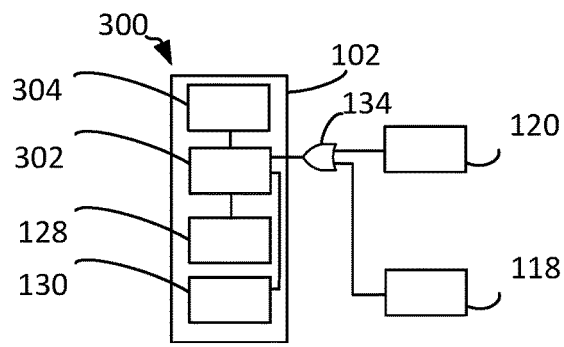
FIGS. 3A, 3B and 3C are block diagrams of an oil monitoring system in accordance with examples.
Figure 3B:
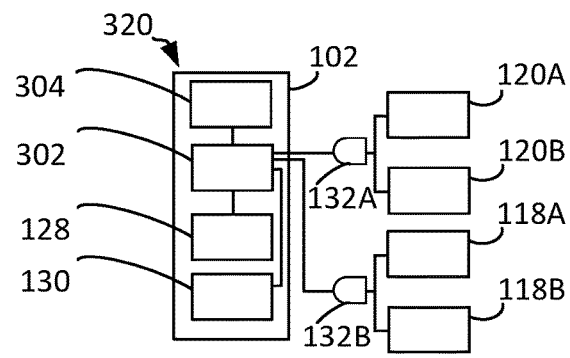

FIGS. 3A and 3B show block diagrams of oil monitoring system 300 and 320 in accordance with examples. In FIG. 3A, oil monitoring system monitoring system 300 comprises electronic gas meter platform 102 and two sensors 118 and 120 for monitoring oil level such as in two different chambers, for example, in accordance with rotary meter 100 of FIGS. 1A and 1B. It is understood that other parameters may be monitoring using applicable sensors.

In FIG. 3B, oil monitoring system 320 comprises electronic gas meter platform 102 coupled to two pairs of oil level sensors 116A/116B and 118A/118B. In this embodiment, the rotary meter is configured for selective orientation. Sensor 116A is positioned in a first chamber for horizontal orientation and 116B is positioned in the same (first) chamber for vertical orientation. Sensor 118A is positioned in a second chamber for horizontal orientation and 118B is positioned in the same (second) chamber for vertical orientation. It is understood that other parameters may be monitoring using applicable sensors.

In FIGS. 3A and 3B electronic gas meter platform 102 comprises a processor 302, a storage device 304 as well as user interface 128. Processor 302 is coupled electronically to storage device 304 and user interface 128. Electronic gas meter platform 102 (e.g. processor 302) may be coupled to other sensors or components (e.g. magnetic meter 113) for other measurements, etc. Electronic gas meter platform 102 may further comprise wired communication interface 130 which is coupled electronically to processor 302.

Each of the user interface 128 and the wired communication interface 130 provide an alarm signaling interface controllable by processor 302 to signal an alarm, whether remotely and/or locally to the rotary meter. An on-board (relative to platform 102) wireless communication interface (not shown) is another example of an alarm signaling interface and it may be electronically controlled by processor 302.

Processor 302 may be a microprocessor, a microcontroller or other. Processor 302 may be implemented as a processor core, central processing unit (CPU) or other.

Storage device 304 may comprise a memory such as a programmable memory, for example, an electrically erasable read-only memory (EEPROM).

User interface 128 may be any one or more of a display screen, a light, a bell or other output device that may signal an alarm. It may be preferred to display the differential pressure value and/or alarm.

Electronic gas meter platform 102 may also comprise a wired communication interface 130, as noted, such as for communicating data including differential pressure data and/or alarm data. Wired communication interface 130 may be a component of the electronic gas meter platform. Wired communication interface 130 may be coupled to a short range and/or long range communication device (not shown) providing an external communication device. Short range and/or long range communication device may comprise an antenna and associated circuits. In an example, not shown, either short range or long range communication device may be on-board and internal to the rotary meter 100. A short range and/or long range communication device may be configured to communicate using known protocols or standards such as to communicate short message service (SMS) messages/text messages via a cellular network, messages via a Bluetooth™ network or Zigbee™ network, etc. (Bluetooth is a trademark of Bluetooth SIG, Inc. Zigbee is a trademark of Zigbee Alliance). Such messages may be alarm messages or data reporting messages or both. Wired communication interface may comprise a universal serial bus (USB), RS-232, Ethernet or other standard interface or a proprietary interface. Wired communication interface 130 may communicate differential pressure data as well as other data. Such may also provide access to storage device 304 such as for providing programming. However other interfaces or means to program storage device 304 may be provided.

In operation, the oil sensors may have open-collector output such that the sensor is open (high) when the oil level is low. Such sensors are easily combined such as for use in a selectable meter orientation configuration where pairs of sensors in each chamber are wired-AND. FIG. 3B shows each of the respective pairs in a wired-AND configuration (e.g. using gates 132A and 132B) to provide input to processor 302.

In such a configuration, one sensor will be always open due to the orientation, the other sensor for the corresponding mounting orientation will be closed (low) if the oil level is OK. But in the case that the oil level is low, both sensors will be open (high), and the output of wired-AND will be high. The electronic meter can detect this wired-AND logic as an oil level low signal for each chamber. In another example (not shown), logic may be used to effectively AND the respective signals within processor 302.

The electronic meter platform 102 may OR the two oil level low signals from different chambers (e.g. using an OR gate 134 (as in FIG. 3A) or logic) to have one oil level low alarm. An OR gate may combine signals from gates 132A and 132B of FIG. 3B. The electronic meter platform 102 will send an alarm pulse (e.g. control one of the interfaces 128, 130) when the low oil level alarm is triggered. The user interface may be controlled such as to display and/or sound an alarm and/or communicate the alarm to another device. The wired communication interface 130 may be controlled to communicate the alarm through a short message (or other message type) if the electronic gas meter platform 102 is so equipped.

The electronic meter platform 102 may control a logging of the alarm in alarm log (e.g. in storage device 304). The storage device may be controlled to log the alarm. Various logging techniques and practices may be used to record and/or report data such as at specific time intervals (e.g. every 15 minutes, every hour, etc.). A log entry may include data representing specific values and flags such as an alarm flag where a flag may be dedicated to an oil level alarm.

Figure 3C:
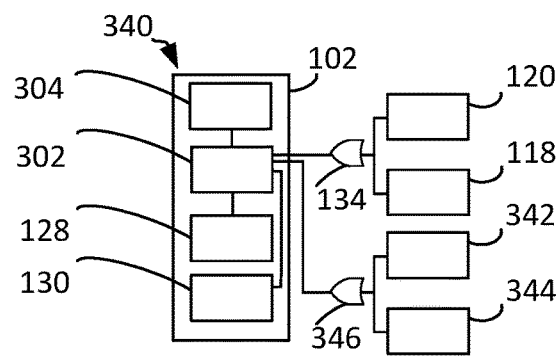

It is also understood that the oil monitoring systems 300 and 320 may be adapted to receive respective signals at processor 302 from two or more types of sensors such as to measure multiple parameters. FIG. 3C shows an adaptation of system 300 defining an oil monitoring system 340. In system 340, processor 302 receives oil sensor signals from sensors 118 and 120, similar to the configuration of system 300, as well as oil sensor signals from sensors 342 and 344. Sensors 342 and 344 may comprise spectrometers mounted to sense oil parameters (conditions) at respective locations 110A and 116A.

Each sensor 118, 120, 342 and 344 may provide its own input signal. For example, an oil level signal (measured by an applicable switch) may be receive separately from an oil condition signal (measured by a spectrometer). As shown, multiple oil level sensors may be employed where each reservoir may have one (FIG. 3A, 3C) or more such sensors (e.g. FIG. 3B). Similarly, multiple spectrometers may be employed where each reservoir may have one (FIG. 3C) or more such sensors (not shown). While the multiple oil level sensors may be coupled to processor 302 via one or more AND gates (FIG. 3B) when two or more such sensors are measuring oil level at a single oil reservoir given the binary nature (on or off) of the oil level signal, it may not be logical to combine the spectrometer signals using such gating. Each spectrometer signal may be received individually. The spectrometer signals may be combined using an OR gate 346 (or logic) such as is described in relation to OR gate 134. This configuration may be useful when the rotary meter is configured for selective horizontal or vertical orientation and the pooling (or other positioning) of oil in a respective reservoir may vary due to the orientation. In an embodiment, a threshold or range of condition measures may be determined such that deviation from same indicates an alarm condition.

Processor 302 of the oil monitoring system may be programmed to periodically wakeup to read the oil sensor signal(s). Other measurements (readings and/or calculations) may also be performed at wakeup. Some measurements may be more frequently made than other measurements.

Figure 4:
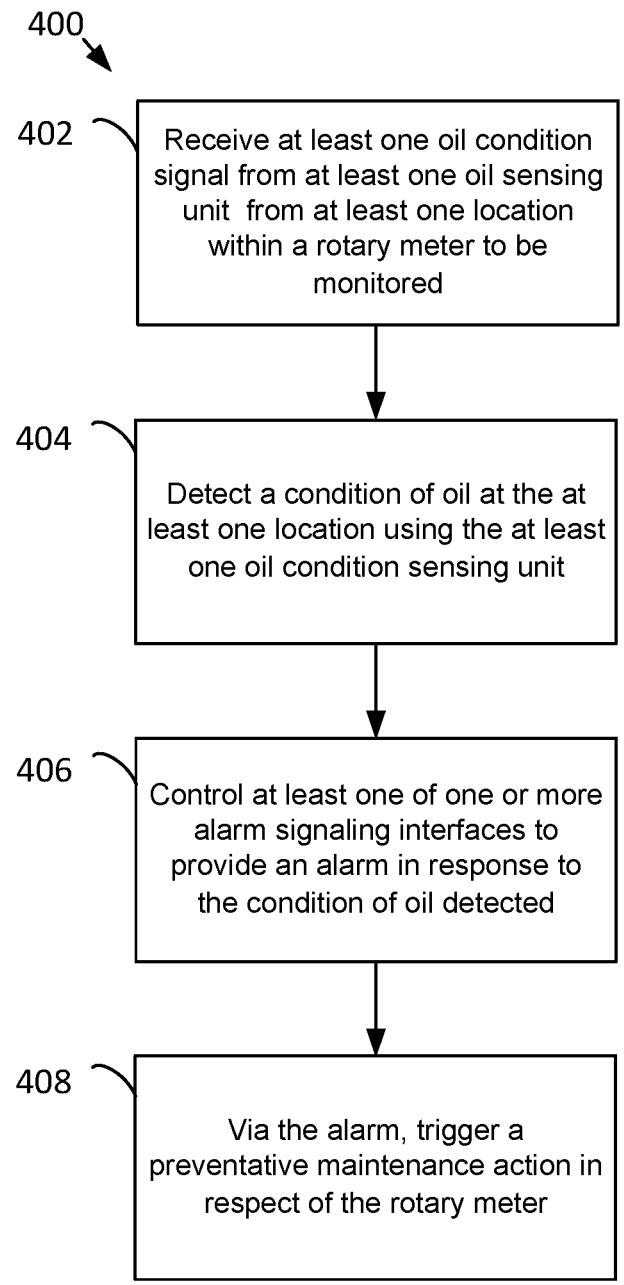
FIG. 4 is a flowchart of operations in accordance with an embodiment.

FIG. 4 is a flowchart of operations 400 such as performed by a main control unit of a rotary meter for performance of a method in accordance with an embodiment. At 402, operations receive at least one oil condition signal from at least one oil sensing unit (118, 120, 118A, 118B, 120A, 120B, 342, 344) from at least one location (110A, 116A) within a rotary meter (100) to be monitored;

At 404, operations detect a condition of oil at the at least one location (110A, 116A) using the at least one oil condition sensing unit (118, 120, 118A, 118B, 120A, 120B, 342, 344); and At 406, operations control at least one of one or more alarm signaling interfaces (128, 130) to provide an alarm in response to the condition of oil detected.

In accordance with an embodiment, via the alarm, operations may trigger performance of preventative maintenance in respect of the rotary meter (e.g. at 408). Operations of the method thus perform oil contamination monitoring of the rotary meter. It is understood that the method may be resumed (e.g. repeated such that operations 402 are started again) after performing maintenance. As such, in any embodiment, the method may comprise resuming oil contamination monitoring in accordance with the method after performance of the preventative maintenance action.

In accordance with any embodiment, the location (110A, 116A) may collect oil within the rotary meter (100).

In some of the any method embodiments, a pair of oil condition sensing units (118A/118B, 120A/120B) may be positioned in respective positions at a respective one of the at least one location (110A, 116A), one of the pair (118A, 120A) positioned to sense the oil condition when the rotary meter is in a first orientation during use and one of the pair (118B, 120B) positioned to sense the oil condition when the rotary meter is in a second orientation during use. Accordingly, in the some method embodiments, the first orientation may be a vertical orientation and the second orientation may be a horizontal orientation. Accordingly, the detecting may be performed at a main control unit of the rotary meter and the method may comprise receiving one oil level signal at the main control unit from the pair of oil condition sensing units via an AND gate. In other of the any method embodiments, the detecting is performed at a main control unit of the rotary meter; the at least one location comprises at least two locations; and the method comprises receiving one oil condition signal at the main control unit from the at least one oil condition sensing unit via an OR gate.

In any method embodiment, the method may comprise controlling a logging of the alarm to the storage device (304).

In any method embodiment, the at least one location may comprise one or both of a magnetic meter chamber and a thrust chamber.

In any method embodiment, the one or more alarm signaling interfaces (128, 130) may comprise a display unit (128).

In any method embodiment, the one or more alarm signaling interfaces (128, 130) may comprise a communication interface (130) to communicate the alarm to a location remote from the rotary meter (100).

In any method embodiment, the at least one oil condition sensing unit may comprises an open-collector output sensor such that the sensor is open (high) when an oil level is low. Such an open-collector output sensor may comprise any one of an ultrasonic level switch; a floater level switch; and an optical level switch.

In any method embodiment, the at least one oil condition sensing unit (342, 344) may comprise a spectrometer.

In any method embodiment, the condition of oil comprises any one or more of oil level, colour, aeration, contamination or other quality indicative of health of the rotary meter (100).

In addition to computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects stored herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

The invention claimed is:

1. An oil monitoring system comprising:
    at least one oil sensing unit to provide at least one oil condition signal from at least one location within a rotary meter to be monitored, the at least one location comprising one or both of a magnetic meter chamber and a thrust chamber of the rotary meter;
    one or more alarm signaling interfaces; and
    a main control unit configured to be coupled to at least one oil condition sensing unit and the one or more alarm signaling interfaces;
    wherein the main control unit is configured to:
        detect a condition of oil at the at least one location using the at least one oil condition sensing unit, the condition of oil comprising any one or more of clarity, colour, or aeration; and
        control at least one of the one or more alarm signaling interfaces to provide an alarm in response to the condition of oil detected.

2. The system of claim 1, wherein the at least one location comprises at least two locations and the main control unit receives one oil condition signal from the at least one oil condition sensing unit via an OR gate.

3. The system of claim 1, wherein the main control unit comprises a storage device and wherein the main control unit is further configured to control a logging of the alarm to the storage device.

4. The system claim 1, wherein the one or more alarm signaling interfaces comprise any of a display unit and a communication interface to communicate the alarm to a location remote from the rotary meter.

5. The system of claim 4, wherein the communication interface comprises or is coupled to an antenna.

6. The system of claim 1, wherein the at least one oil condition sensing unit comprises a spectrometer.

7. The system of claim 1, wherein the condition of oil further comprises any one or more of oil level, contamination or other quality indicative of health of the rotary meter.

8. An oil monitoring system comprising:
    at least one oil sensing unit to provide at least one oil condition signal from at least one location within a rotary meter to be monitored;
    one or more alarm signaling interfaces; and
    a main control unit configured to be coupled to at least one oil condition sensing unit and the one or more alarm signaling interfaces;
    wherein the main control unit is configured to:
        detect a condition of oil at the at least one location using the at least one oil condition sensing unit; and
        control at least one of the one or more alarm signaling interfaces to provide an alarm in response to the condition of oil detected; and
    wherein a pair of oil condition sensing units is positioned in respective positions at a respective one of the at least one location, one of the pair positioned to sense the oil condition when the rotary meter is in a first orientation during use and one of the pair positioned to sense the oil condition when the rotary meter is in a second orientation during use.

9. The system of claim 8, wherein the location collects oil within the rotary meter.

10. The system of claim 8, wherein the first orientation is a vertical orientation and the second orientation is a horizontal orientation.

11. The system of claim 8, wherein the main control unit receives one oil condition signal from the pair of oil condition sensing units via an AND gate.

12. The system of claim 8, wherein the at least one oil condition sensing unit comprises an open-collector output sensor such that the sensor is open when an oil level is low.

13. The system of claim 12, wherein the open-collector output sensor is any one of an ultrasonic level switch; a floater level switch; and an optical level switch.

14. A rotary meter with an oil monitoring system, wherein the oil monitoring system comprises:
    at least one oil sensing unit to provide at least one oil condition signal from at least one location within a rotary meter to be monitored, the at least one location comprising one or both of a magnetic meter chamber and a thrust chamber of the rotary meter;
    one or more alarm signaling interfaces; and
    a main control unit configured to be coupled to at least one oil condition sensing unit and the one or more alarm signaling interfaces;
    wherein the main control unit is configured to:
        detect a condition of oil at the at least one location using the at least one oil condition sensing unit, the condition of oil comprising any one or more of clarity, colour, or aeration; and
        control at least one of the one or more alarm signaling interfaces to provide an alarm in response to the condition of oil detected.

15. A method, comprising:
- receiving at least one oil condition signal from at least one oil sensing unit from at least one location within a rotary meter to be monitored, the at least one location comprising one or both of a magnetic meter chamber and a thrust chamber;
- detecting a condition of oil at the at least one location using the at least one oil condition sensing unit, the condition of oil comprising any one or more of clarity, colour, or aeration; and
- controlling at least one of one or more alarm signaling interfaces to provide an alarm in response to the condition of oil detected.

16. The method of claim 15, wherein the alarm triggers a preventative maintenance action in respect of the rotary meter.

17. The method of claim 16, wherein the method performs oil contamination monitoring of the rotary meter and wherein the method comprises resuming oil contamination monitoring in accordance with the method after performance of the preventative maintenance action.

18. The method of claim 15, wherein the condition of oil further comprises any one or more of oil level, contamination or other quality indicative of health of the rotary meter.

19. A method, comprising:
- receiving at least one oil condition signal from at least one oil sensing unit from at least one location within a rotary meter to be monitored;
- detecting a condition of oil at the at least one location using the at least one oil condition sensing unit; and
- controlling at least one of one or more alarm signaling interfaces to provide an alarm in response to the condition of oil detected;
- wherein a pair of oil condition sensing units is positioned in respective positions at a respective one of the at least one location, one of the pair positioned to sense the oil condition when the rotary meter is in a first orientation during use and one of the pair positioned to sense the oil condition when the rotary meter is in a second orientation during use.

\* \* \* \* \*